(12) United States Patent
Strozyk (10) Patent No.: US 11,679,307 B2
(45) Date of Patent: Jun. 20, 2023

(54) METHOD OF FORMING A PLURALITY OF GOLF BALLS

(71) Applicant: Acushnet Company, Fairhaven, MA (US)

(72) Inventor: Richard Strozyk, Berkley, MA (US)

(73) Assignee: Acushnet Company, Fairhaven, MA (US)

(*) Notice: Subject to any disclaimer, the term of this patent is extended or adjusted under 35 U.S.C. 154(b) by 46 days.

(21) Appl. No.: 17/222,416

(22) Filed: Apr. 5, 2021

(65) Prior Publication Data

US 2022/0314081 A1    Oct. 6, 2022

(51) Int. Cl.
| | | |
|---|---|---|
| *B29C 43/18* | (2006.01) | |
| *A63B 45/00* | (2006.01) | |
| *B29C 39/10* | (2006.01) | |
| *B29C 39/18* | (2006.01) | |

(52) U.S. Cl.
CPC ............. *A63B 45/00* (2013.01); *B29C 39/10* (2013.01); *B29C 39/18* (2013.01); *B29C 43/18* (2013.01); *B29C 43/183* (2013.01)

(58) Field of Classification Search
CPC .................................................. B29C 43/18
USPC ................ 264/297.1, 297.5, 297.8, 163
See application file for complete search history.

(56) References Cited

U.S. PATENT DOCUMENTS

| | | | |
|---|---|---|---|
| 3,954,923 A * | 5/1976 | Valyi | B65D 75/30 264/254 |
| 4,959,000 A | 9/1990 | Giza | |
| 5,147,657 A | 9/1992 | Giza | |
| 5,360,588 A * | 11/1994 | Heyn | B29C 45/14024 425/126.1 |
| 5,451,356 A * | 9/1995 | Hebert | B29C 51/32 264/321 |
| 5,599,598 A * | 2/1997 | Valyi | B65D 1/0215 264/513 |
| 5,688,193 A | 11/1997 | Kasasima et al. | |
| 5,798,071 A | 8/1998 | Boehm | |
| 5,824,258 A | 10/1998 | Yamaguchi | |
| 5,827,466 A | 10/1998 | Yamaguchi | |
| 5,827,548 A | 10/1998 | Lavallee et al. | |
| 5,827,567 A | 10/1998 | Molitor | |
| 5,840,351 A | 11/1998 | Inoue et al. | |
| 5,874,038 A | 2/1999 | Kasashima et al. | |
| 5,879,599 A | 3/1999 | Inoue et al. | |
| 5,902,193 A | 5/1999 | Shimosaka et al. | |
| 5,906,551 A | 5/1999 | Kasashima et al. | |
| 5,935,500 A | 8/1999 | Stanton et al. | |
| 5,947,844 A | 9/1999 | Shimosaka et al. | |
| 5,975,869 A | 11/1999 | Shimosaka et al. | |
| 6,024,551 A | 2/2000 | Yamaguchi | |

(Continued)

*Primary Examiner* — Edmund H Lee (74) *Attorney, Agent, or Firm* — Steven Landolfi, Jr.

(57) ABSTRACT

The present invention is directed to a method of forming plurality of golf balls comprising steps of: providing plurality of inner cores; forming sheet of uncured rubber; forming plurality of preps in the sheet of uncured rubber such that each prep contains a concave top surface and is detachably connected to coupling material; loading the preps and coupling material into a core mold; loading plurality of inner cores into mold such that the inner cores are aligned with the concave surface of each prep; molding the preps about the inner cores to form outer core layers; and forming covers about outer core layers.

10 Claims, 4 Drawing Sheets

(56) References Cited

U.S. PATENT DOCUMENTS

| | | |
|---|---|---|
| 6,033,611 A | 3/2000 | Yamaguchi |
| 6,050,803 A | 4/2000 | Omura et al. |
| 6,068,561 A * | 5/2000 | Renard .............. A63B 37/0045 |
| | | 473/364 |
| 6,089,847 A | 7/2000 | Inoue et al. |
| 6,093,360 A | 7/2000 | Inoue et al. |
| 6,123,534 A | 9/2000 | Kasashima et al. |
| 6,129,881 A | 10/2000 | Puniello |
| 6,168,407 B1 | 1/2001 | Kasashima et al. |
| 6,218,453 B1 | 4/2001 | Boehm et al. |
| 6,235,230 B1 | 5/2001 | Puniello |
| 6,309,002 B1 | 10/2001 | Bouligny et al. |
| 6,379,138 B1 | 4/2002 | Puniello et al. |
| 6,422,850 B1 | 7/2002 | Shannon et al. |
| 6,436,327 B1 | 8/2002 | Cloutier et al. |
| 6,447,406 B1 | 9/2002 | Kato |
| 6,517,451 B2 | 2/2003 | Carvallaro et al. |
| 6,524,419 B1 | 2/2003 | Dabrowski, Jr. et al. |
| 6,562,912 B1 | 5/2003 | Sullivan et al. |
| 6,659,886 B1 | 12/2003 | Yamagishi et al. |
| 6,685,456 B2 | 2/2004 | Sajima |
| 6,776,942 B2 | 8/2004 | Kim |
| 6,787,091 B2 | 9/2004 | Dalton et al. |
| 6,817,852 B2 | 11/2004 | Lavallee |
| 6,817,853 B2 | 11/2004 | Simonds et al. |
| 6,877,974 B2 | 4/2005 | Puniello et al. |
| 6,893,359 B2 | 5/2005 | Shimosaka |
| 6,913,726 B2 | 7/2005 | Brum |
| 6,936,205 B2 | 8/2005 | Cavallaro et al. |
| 7,135,138 B2 | 11/2006 | Puniello et al. |
| 7,150,618 B2 | 12/2006 | Sajima et al. |
| 7,153,467 B2 * | 12/2006 | Brum .............. C08L 53/00 |
| | | 264/250 |
| 7,204,946 B2 | 4/2007 | Moore |
| 7,223,085 B2 | 5/2007 | Puniello et al. |
| 7,252,488 B2 | 8/2007 | Nakai |
| 7,347,964 B2 | 3/2008 | Bergin et al. |
| 7,381,041 B2 | 6/2008 | Wilber |
| 7,547,258 B2 | 6/2009 | Kasashima et al. |
| 7,632,449 B2 | 12/2009 | Wachi |
| 7,648,667 B2 | 1/2010 | Brum |
| 7,704,431 B2 | 4/2010 | Endo et al. |
| 7,718,107 B2 | 5/2010 | Endo et al. |
| 7,842,220 B2 | 11/2010 | Hinomoto et al. |
| 7,927,524 B2 | 4/2011 | Vora et al. |
| 7,935,288 B2 * | 5/2011 | Brum .............. B29C 51/02 |
| | | 264/250 |
| 8,083,977 B2 | 12/2011 | Nakagawa et al. |
| 8,267,809 B2 | 9/2012 | Nakagawa et al. |
| 8,408,891 B2 | 4/2013 | Nakagawa et al. |
| 8,512,619 B2 | 8/2013 | Tutmark |
| 8,662,882 B2 | 3/2014 | Wang |
| 8,714,956 B2 | 5/2014 | Madson et al. |
| 8,980,151 B2 | 3/2015 | Chou et al. |
| 9,108,347 B2 | 8/2015 | Nakagawa et al. |
| 9,211,662 B2 | 12/2015 | Kennedy, III et al. |
| 10,046,210 B1 | 8/2018 | Vora et al. |
| 10,427,334 B1 | 10/2019 | Strozyk et al. |
| 10,894,348 B2 * | 1/2021 | Vora .............. A63B 37/0024 |
| 2002/0016435 A1 | 2/2002 | Simonutti et al. |
| 2002/0086074 A1 | 7/2002 | Lavallee |
| 2003/0067088 A1 | 4/2003 | Scolamiero et al. |
| 2003/0100386 A1 | 5/2003 | Jordan |
| 2003/0139228 A1 | 7/2003 | Cavallaro et al. |
| 2003/0153402 A1 | 8/2003 | Simonds et al. |
| 2003/0195059 A1 * | 10/2003 | Brum .............. B32B 7/022 |
| | | 473/371 |
| 2004/0048687 A1 | 3/2004 | Jordan |
| 2004/0072629 A1 | 4/2004 | Keller et al. |
| 2004/0080080 A1 | 4/2004 | Dalton et al. |
| 2004/0157681 A1 | 8/2004 | Lemons et al. |
| 2005/0037866 A1 | 2/2005 | Emerson et al. |
| 2005/0159247 A1 | 7/2005 | Lemons et al. |
| 2006/0073913 A1 | 4/2006 | Castner |
| 2006/0111543 A1 | 5/2006 | Dewanjee |
| 2007/0035063 A1 | 2/2007 | Lavallee et al. |
| 2009/0297653 A1 | 12/2009 | Lavallee et al. |
| 2010/0087227 A1 | 4/2010 | Ogg et al. |
| 2010/0087274 A1 | 4/2010 | Ogg et al. |
| 2011/0130217 A1 | 6/2011 | Ogg et al. |
| 2012/0077620 A1 | 3/2012 | Ogg et al. |
| 2013/0072323 A1 | 3/2013 | Lin |
| 2013/0140734 A1 | 6/2013 | Chou et al. |
| 2013/0172105 A1 | 7/2013 | Ishii et al. |
| 2014/0054819 A1 | 2/2014 | Lin |
| 2014/0077414 A1 | 3/2014 | Kim et al. |
| 2014/0367884 A1 | 12/2014 | Iizuka et al. |
| 2015/0367179 A1 | 12/2015 | Farrell et al. |
| 2015/0367180 A1 | 12/2015 | Farrell et al. |
| 2015/0367181 A1 | 12/2015 | Farrell et al. |
| 2016/0346972 A1 | 12/2016 | Binette |
| 2017/0008205 A1 | 1/2017 | Vora et al. |
| 2017/0320152 A1 | 11/2017 | Hampton et al. |
| 2019/0381712 A1 * | 12/2019 | Vora .............. A63B 37/0045 |
| 2020/0247034 A1 * | 8/2020 | Eickhoff .............. B29C 51/268 |

* cited by examiner

METHOD OF FORMING A PLURALITY OF GOLF BALLS

FIELD OF THE INVENTION

The field of the invention broadly comprises methods of forming dual core golf balls.

BACKGROUND OF THE INVENTION

Today, both professional and amateur golfers alike use multi-piece, solid golf balls. Three-piece, four-piece, and even five-piece golf balls became more popular with the development of manufacturing technologies for efficiently producing them. Multi-layered cores may be comprised, for example, of a spherical inner core/center containing a relatively soft and resilient material, surrounded by an outer core layer made of a harder and more rigid material. This "dual-core" sub-assembly is then encapsulated by at least one layer such as a single or multi-layered cover layer, and optionally one or more intermediate layers to complete the golf ball construction.

Golf ball manufacturers pre-select the materials for each layer to target and impart desirable golf ball performance properties. Currently, a broad range of options are available for strategically incorporating and coordinating layers within each golf ball construction. In multi-layered golf balls, each of the core, intermediate layer and cover properties, such as hardness, compression, resilience, specific gravity, outer diameter, and thickness, can be preselected and coordinated to target play characteristics such as spin, initial velocity and feel of the resulting golf ball.

The core is an important part of any golf ball because it acts as an engine or spring for the golf ball. Therefore, golf ball manufacturers continue to improve the core's construction and composition, which are key factors in targeting the resiliency and rebounding performance of the golf ball.

Dual cores are often formed by molding a prep to form an inner core or center. Then, preps comprised of outer core material are molded about the inner core/center. In this regard, the concentricity of the resulting dual core is an important factor. An improperly balanced golf ball can experience "hooking" or "slicing" when in flight after impact with a golf club face and can roll out of alignment during putting.

SUMMARY OF THE INVENTION

Advantageously, in a method of making a plurality of golf balls according to the invention, multiple preps for outer core layers can be simultaneously formed and loaded into a mold press to produce a plurality of dual cores for golf balls at the same time, without sacrificing dual core concentricity, rather than manually placing and arranging preps in the mold press individually.

In one embodiment, a method of the invention of forming a plurality of golf balls comprising inner cores, outer core layers and covers, comprises the steps of: providing a plurality of inner cores; forming a sheet of uncured rubber; forming a plurality of preps in the sheet of uncured rubber such that each prep contains a concave top surface and is detachably connected to coupling material; loading the preps and coupling material into a mold; loading the plurality of inner cores into the mold such that the inner cores are aligned with the concave top surface of each prep; molding the preps about the inner cores to form the outer core layers; and forming covers about the outer core layers.

In another embodiment, a method of the invention of forming a plurality of golf balls comprising inner cores, outer core layers and covers, comprises the steps of: providing a plurality of inner cores; forming at least two sheets of uncured rubber; forming a plurality of preps in the sheets of uncured rubber such that each prep contains a concave top surface and is detachably connected to coupling material; loading the preps and coupling material into a bottom mold and a top mold; loading the plurality of inner cores into the bottom mold such that the inner cores are aligned with the concave top surface of each prep in the bottom mold; closing the top mold and the bottom mold; molding the preps about the inner cores to form the outer core layers; and forming covers about the outer core layers.

In one embodiment of the invention, the coupling material may be formed while forming the plurality of concave top surfaces and the plurality of preps in the sheet of uncured rubber. In a specific embodiment, uncured rubber may be fed between a set of opposing rollers that are collectively configured to form the coupling material and the plurality of preps having concave top surfaces.

In a different embodiment, a sheet of uncured rubber having a uniform thickness may be formed in a first set of rollers and then a plurality of concave surfaces can be formed into the sheet of uncured rubber in a second set of rollers. Preferably, the uncured rubber is mixed and may be extruded through the first set of rollers into the sheet of uncured rubber. Then, the sheet of uncured rubber can be fed through another set of rollers that are collectively configured to form the preps with concave top surfaces and the coupling material therein.

The terms "concave surface" and "concave top surface" are used herein interchangeably to refer to the concave surface that is created in the sheet of uncured rubber and forms the top surface of its corresponding prep.

The coupling material comprises uncured rubber and may form any structure that interconnects the preps detachably. In a particular embodiment, the coupling material may comprise a webbing detachably coupling the preps. The webbing is a structure consisting of strips of uncured rubber interconnecting the preps and an outer perimeter and leaving empty spaces between the preps. Preferably, the empty spaces are substantially square or diamond-shaped.

In this embodiment, uncured rubber may be fed between a set of opposing rollers that are collectively configured to form the webbing and the plurality of preps with concave top surfaces. A set of opposing rollers may have a plurality of convex surfaces formed on one roller such that each convex surface of the first roller will form a concave surface in the sheet of uncured rubber when uncured rubber is fed between the first roller and a second roller. The first roller or the second roller can further contain a predetermined reverse webbing pattern that will form the webbing in the sheet of uncured rubber between the plurality of concave surfaces when the sheet of uncured rubber is fed between the first roller and the second roller. However, in a different embodiment, the webbing and the plurality of preps may be formed simultaneously in the sheet of uncured rubber after the concave surfaces were formed in a previous step. For example, after the sheet of uncured rubber is fed through rollers to form the concave surfaces, the webbing and the plurality of preps may be formed using a steel rule die.

In a most preferred embodiment, the sheet of uncured rubber, comprising the coupling material and preps with concave top surfaces, is provided into the core bottom mold as a continuous sheet wherein the preps align with each of the core mold cavities. The coupling material and the preps may be secured within the core mold by fasteners that are located in each corner of the sheet comprising the coupling material and preps with concave top surfaces. The fasteners can mate with corresponding fasteners disposed within the corners of the core mold. Preferably, the fasteners are located in each corner of the sheet such that when the coupling material and preps are placed into the core mold, the preps align with the centers of the core mold cavities.

A method of forming a plurality of golf balls alternatively comprises the steps of: providing a plurality of inner cores; providing or forming a plurality of sheets of uncured rubber; forming a plurality of concave surfaces in the sheets in a predetermined pattern; forming a plurality of preps in the sheets wherein each prep has a top surface comprised of one of the concave surfaces; forming webbing in the sheets such that each prep is detachably connected to the webbing; loading the webbing and preps into a bottom core mold and a top core mold; loading the inner cores into the bottom core mold such that the concave top surface of each prep in the bottom core mold aligns with an outer surface of one of the plurality of inner cores; closing the top mold and the bottom mold; molding the preps about the inner cores to form outer core layers; and forming covers about the outer core layers.

In one particular embodiment of the present invention, a set of opposing rollers are provided that are collectively configured to form the sheet of concave surfaces, the preps, and the webbing. In a specific embodiment, a first roller of the set of opposing rollers has a plurality of convex surfaces formed thereon wherein the convex surfaces form the concave surface in the sheet of uncured rubber when uncured rubber is fed between the first roller and the second roller. The first roller can further contain a predetermined reverse webbing pattern that forms the webbing in the sheet of uncured rubber between the plurality of concave surfaces when uncured rubber is fed between the first roller and the second roller.

In a different embodiment of the present invention, a set of opposing rollers are provided to form a plurality of concave surfaces in a sheet of uncured rubber. Then, a steel rule die may be used to simultaneously form webbing and a plurality preps in the sheet such that each prep includes one of the concave surfaces in a top surface thereof.

BRIEF DESCRIPTION OF THE DRAWINGS

These and other aspects of the present invention as set forth in the appended claims may be more fully understood with reference to, but not limited by, following detailed description in connection with the accompanying drawings in which like numerals refer to like elements of any system used to perform the steps of the inventive method of making a plurality of golf balls and resulting golf balls as follows:

DETAILED DESCRIPTION

The method of the invention significantly reduces dual core manufacture time and cost and improves efficiency of golf ball manufacturing by enabling an entire sheet of preps having concave top surfaces to be simultaneously loaded into a mold press to form a plurality of dual cores.

In one embodiment, a method of the invention of forming a plurality of golf balls comprising inner cores, outer core layers and covers, comprises the steps of: providing a plurality of inner cores; forming a sheet of uncured rubber; forming a plurality of preps in the sheet of uncured rubber such that each prep contains a concave top surface and is detachably connected to coupling material; loading the preps and coupling material into a mold; loading the plurality of inner cores into the mold such that the inner cores are aligned with the concave top surface of each prep; molding the preps about the inner cores to form the outer core layers; and forming covers about the outer core layers.

In another embodiment, a method of the invention of forming a plurality of golf balls comprising inner cores, outer core layers and covers, comprises the steps of: providing a plurality of inner cores; forming at least two sheets of uncured rubber; forming a plurality of preps in the sheets of uncured rubber such that each prep contains a concave top surface and is detachably connected to coupling material; loading the preps and coupling material into a bottom mold and a top mold; loading the plurality of inner cores into the bottom mold such that the inner cores are aligned with the concave top surface of each prep in the bottom mold; closing the top mold and the bottom mold; molding the preps about the inner cores to form the outer core layers; and forming covers about the outer core layers.

As used herein, the term "uncured" means that the material forming a golf ball element such as an inner core, or outer core layer may be partially cured but is not fully cured. Golf ball core material generally comprises rubber and materials that are mixed into an uncured rubber material. The material is extruded through a pair of rollers to form a flat sheet. In the prior art, to form thermoset rubber cores, the flat sheet is formed into preps through an extrusion process and the preps are fully cured in core mold cavities.

In the present invention, the sheets of uncured rubber, plurality of concave surfaces, plurality of preps, and adjacent coupling material (e.g., webbing) can be created simultaneously or sequentially. For example, in a preferred embodiment of the invention, uncured rubber can be mixed and formed into the sheet of uncured rubber. Preferably, the rollers forming the sheets contain a plurality of convex surfaces so that they form a plurality of concave surfaces in a surface of the sheet. Then, a plurality of preps can be formed in the sheet such that they are interconnected by coupling material and each prep has a top surface comprising the concave surfaces formed in the sheet.

In one embodiment, the coupling material may be formed simultaneously while forming the plurality of concave surfaces and the plurality of preps in the sheet of uncured rubber. In a specific embodiment, uncured rubber may be fed between a set of opposing rollers that are collectively configured to form the coupling material and the plurality of preps having concave top surfaces.

In a different embodiment, a sheet of uncured rubber having a uniform thickness may be formed in a first set of rollers and then a plurality of concave surfaces are formed in the sheet in a second set of opposing rollers. Preferably, the uncured rubber is mixed and may be extruded through the first set of rollers into the sheet of uncured rubber having a uniform thickness. Then, the sheet can be fed through another set of rollers that are collectively configured to form the preps with concave top surfaces and the coupling material.

In a more particular embodiment, the coupling material may comprise a webbing coupling the preps. In this embodiment, uncured rubber may be fed between a set of opposing rollers that are collectively configured to form the webbing and the plurality of preps with concave top surfaces. A set of opposing rollers may have a plurality of convex surfaces formed on one roller such that each convex surface of the first roller will form a concave surface in the sheet of uncured rubber when uncured rubber is fed between the first roller and a second roller. The first roller or the second roller can further contain a predetermined reverse webbing pattern that will form the webbing in the sheet of uncured rubber between the plurality of concave surfaces when the sheet is fed between the first roller and the second roller.

However, in a different embodiment, the webbing and the plurality of preps may be formed simultaneously in the sheet of uncured rubber after the concave surfaces were formed in a previous step. For example, after the sheet of uncured rubber is fed through rollers to form the concave surfaces, the webbing and the plurality of preps may be formed using a cutting process such as a steel rule die process.

In a more preferred embodiment of the invention, the method of forming the golf balls can include the step of forming fasteners in the corners of the sheet of preps and coupling material and further providing corresponding fasteners in the core molds such that the sheets can be coupled to the molds. In this embodiment, when the sheets are coupled to the bottom core mold and the top mold, the preps are aligned with the centers of the mold cavities.

In the present invention, the opposing rollers forming the preps and coupling material may be parallel and spaced apart as desired to target the thickness of the resulting sheet of uncured rubber. Meanwhile, the length of each roller can be predetermined to target the width of the resulting sheet of uncured rubber. Thus, it is envisioned that the length and width of each sheet of uncured rubber can be targeted as desired based on the dimensions of the core mold presses that will receive the sheets of uncured rubber once the concave surfaces, corresponding preps, and coupling material are formed. Furthermore, it is envisioned that multiple pre-cut sheets may be placed in the bottom core mold and top core mold presses; or, a single, continuous sheet of preps, and coupling material may be placed in the bottom core mold and another single sheet in the top core mold.

In certain embodiments, it is to be understood that the method and system may optionally include multiple sets of rollers. For example, there may be a first set of rollers that form a flat sheet of uncured rubber having a uniform thickness, a second set of rollers that form concave surfaces in the top surface of the sheet, and a third set of rollers that form preps and coupling material such that each prep is comprised of a concave top surface.

In yet another embodiment, it is to be understood that the method and system may optionally include multiple sets of rollers and a steel rule die. For example, there may be a first set of rollers that form a flat sheet of uncured rubber having a uniform thickness, a second set of rollers that form concave surfaces in the top surface of the sheet, and a steel rule die that forms the preps and coupling material such that each prep is comprised of a concave top surface.

In the present invention, the inner cores may be surface-treated to increase the adhesion between their outer surfaces and the outer core layer. Such surface-treatment may include mechanically or chemically-abrading the outer surface of the inner core. For example, the inner core may be subjected to corona-discharge, plasma-treatment, silane-dipping, or other treatment methods known to those in the art.

In a particular embodiment, A method of forming a plurality of golf balls comprising a plurality of inner cores, outer core layers and covers, comprising the steps of: providing a plurality of inner cores; mixing rubber and additives to form uncured rubber and feeding the uncured rubber through a first pair of rollers to form a sheet of uncured rubber; feeding the sheet of uncured rubber through a second set of rollers wherein a first roller is comprised of convex surfaces that form concave surfaces in the sheet in a predetermined pattern; forming a plurality of preps in the sheet such that each prep contains one of the concave surfaces; forming a webbing in the sheet that detachably couples the preps; loading the preps and webbing into a top core mold and a bottom core mold; loading the inner cores into the bottom core mold such that the concave top surface of each prep in the bottom core mold aligns with an outer surface of one of the plurality of inner cores; closing the top mold and the bottom mold; molding the preps about the inner cores to form outer core layers; and forming covers about the outer core layers.

In a specific embodiment, a method of forming a plurality of golf balls alternatively comprises the steps of: providing a plurality of inner cores; providing or forming a plurality of sheets of uncured rubber; forming a plurality of concave surfaces in the sheets in a predetermined pattern; forming a plurality of preps in the sheets wherein each prep has a top surface comprised of one of the concave surfaces; forming webbing in the sheets such that each prep is detachably connected to the webbing; loading the webbing and preps into a bottom core mold and a top core mold; loading the inner cores into the bottom core mold such that the concave top surface of each prep in the bottom core mold aligns with an outer surface of one of the plurality of inner cores; closing the top mold and the bottom mold; molding the preps about the inner cores to form outer core layers; and forming covers about the outer core layers.

Some aspects of a method of the invention of forming a plurality of golf balls as discussed above may be more fully understood with reference to, but not limited by, FIGS. 1-6 which will be described together below to emphasize certain embodiments of the invention.

Figure 1:
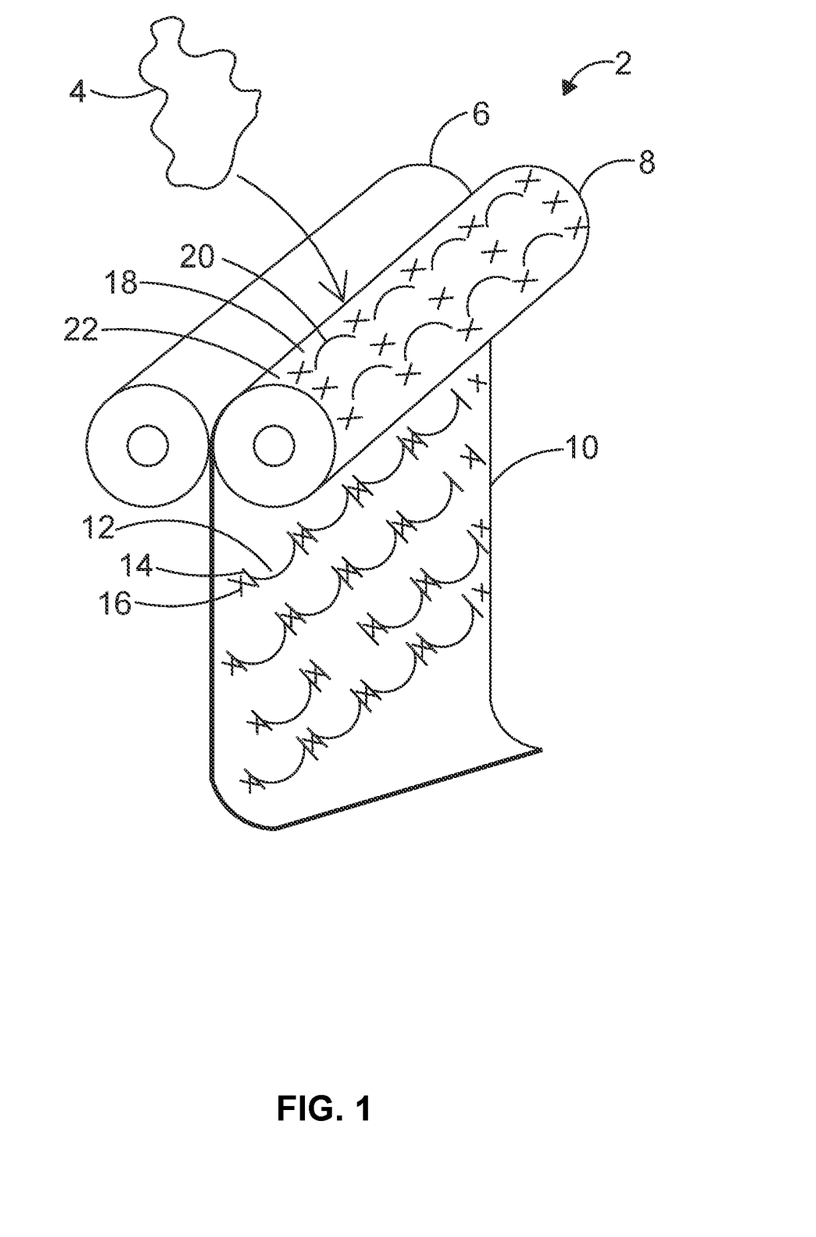
FIG. 1 is a perspective view of one system for practicing the method of the invention.

FIG. 1 is a perspective view of one embodiment of opposing rollers according to the invention wherein a sheet of uncured rubber can be formed into a plurality of preps comprising concave top surfaces and webbing.

Specifically, in system 2 of FIG. 1, a pre-mixed amount of uncured rubber 4 may be provided between a set of opposing rollers 6 and 8 which are configured to form sheet of uncured rubber 10 containing a plurality of preps 14 with concave top surfaces 12, which are collectively detachably connected to coupling material such as webbing 16. In this embodiment, roller 8 has a surface 18 containing a plurality of convex surface portions 20 and a reverse webbing pattern 22 which collectively create the plurality of preps 14 with concave top surfaces 12 detachably connected to webbing 16 when uncured rubber 4 is fed between the opposing rollers 6 and 8.

Rollers 6 and 8 are parallel and can be spaced apart by a predetermined distance to target the thickness of sheet of uncured rubber 10 and plurality of preps 14. In this embodiment, a reverse webbing pattern 22 is provided on roller 8 only, but embodiments are indeed envisioned wherein reverse webbing pattern 22 may be provided on roller 6, roller 8, or both.

Figure 2:
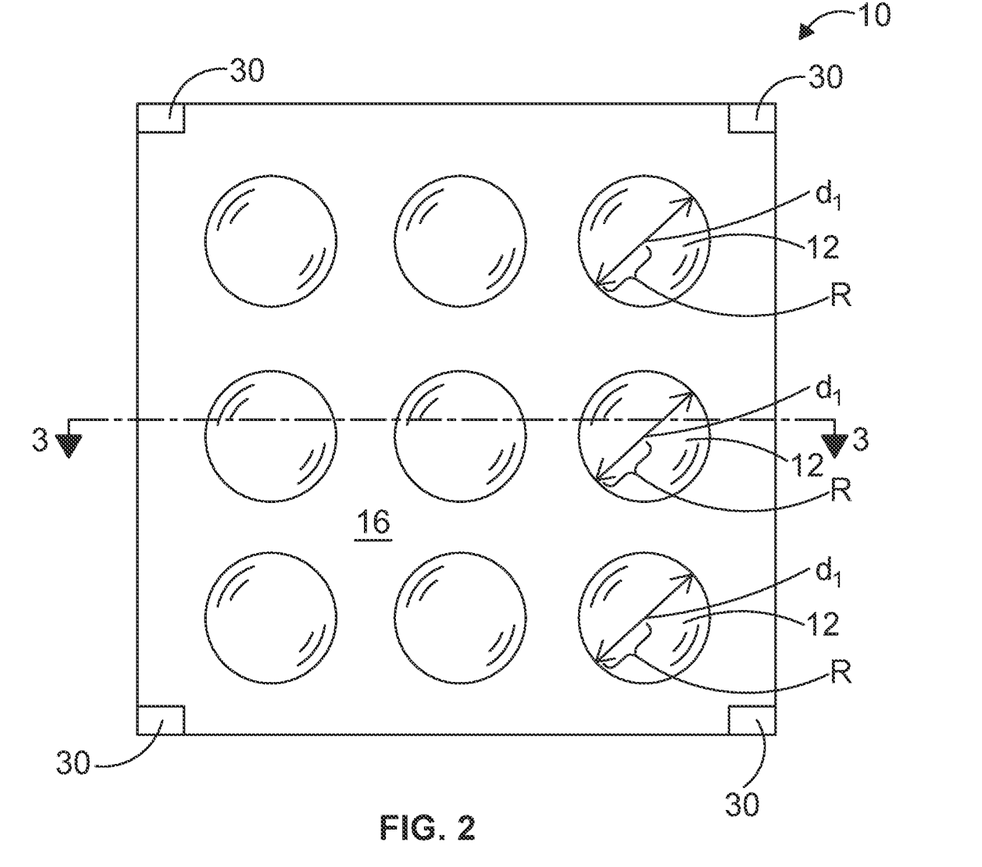
FIG. 2 is a top view of a sheet of coupling material and preps that can be loaded within a mold according to one embodiment of the invention.
Figure 3:
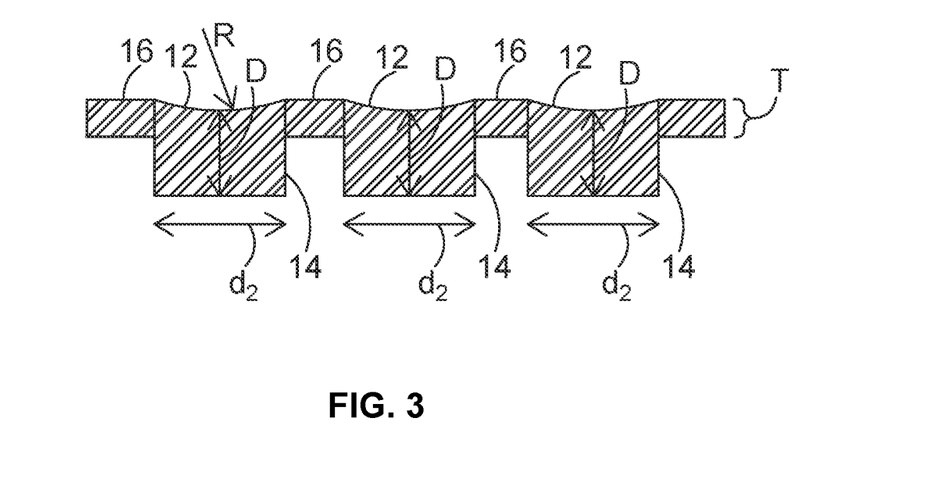
FIG. 3 is a cross-sectional view of the coupling material and preps in FIG. 2.

FIG. 2 is a top view of one embodiment of a resulting sheet of uncured rubber 10 containing a plurality of concave top surfaces 12 and coupling material 16. The sheet of uncured rubber 10 also includes lock pins 30 in the corners thereof. FIG. 3 depicts a cross-sectional view of the sheet 10 in FIG. 2. This cross-sectional view depicts a plurality of concave top surfaces 12 and corresponding plurality of preps 14 and coupling material 16. In this FIG. 2, the bottom surface 24 of the preps will be inserted into mold cavities, not shown, and preferably the preps will align with the centers of the mold cavities. As shown, the depth D of the preps 14 is greater than the thickness T of the coupling material 16. Moreover, the concave top surfaces 12 have a radius R and a diameter $d_1$ that is substantially equal to the diameter $d_2$ of the preps 14. However, the diameter $d_1$ of the concave top surfaces 12 is preferably between ½ the diameter $d_2$ of the preps 14 and 1.1 times the diameter $d_2$ of the preps 14. Also, the radius R of the concave top surfaces 12 is preferably greater than the radius of the inner cores, not shown. More particularly, the radius R of the concave top surfaces is preferably between 1.5 and 5 times the radius of the inner cores, not shown.

Figure 4:
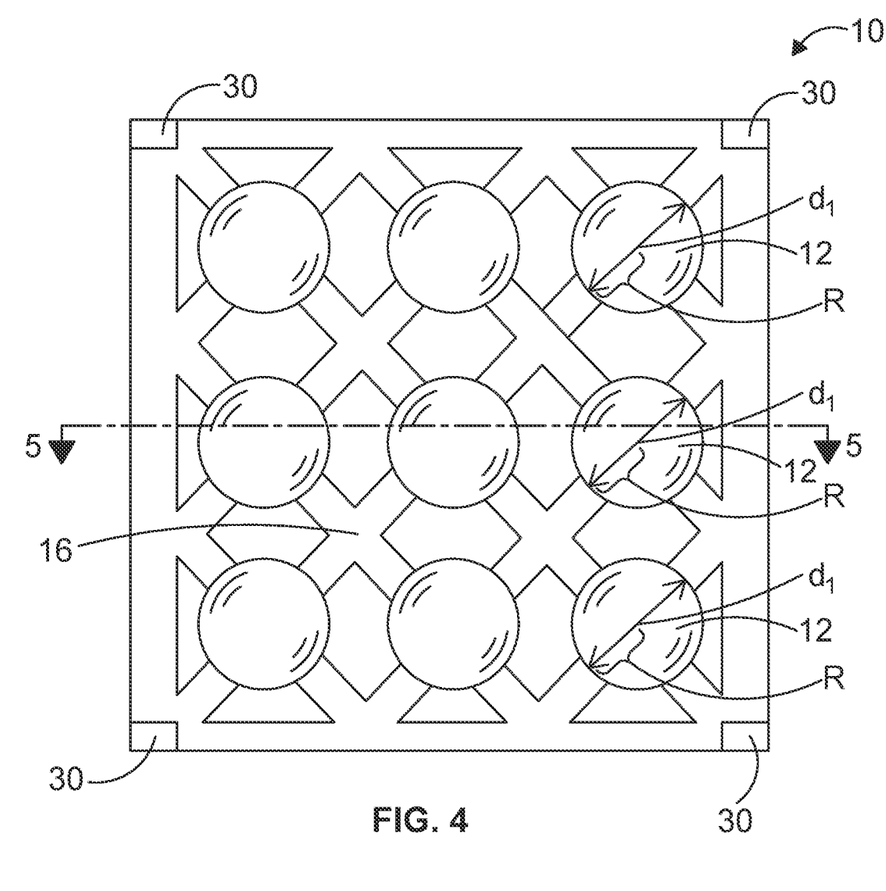
FIG. 4 is a top view of a sheet of coupling material and preps that can be loaded within a mold according to one embodiment of the invention.
Figure 5:
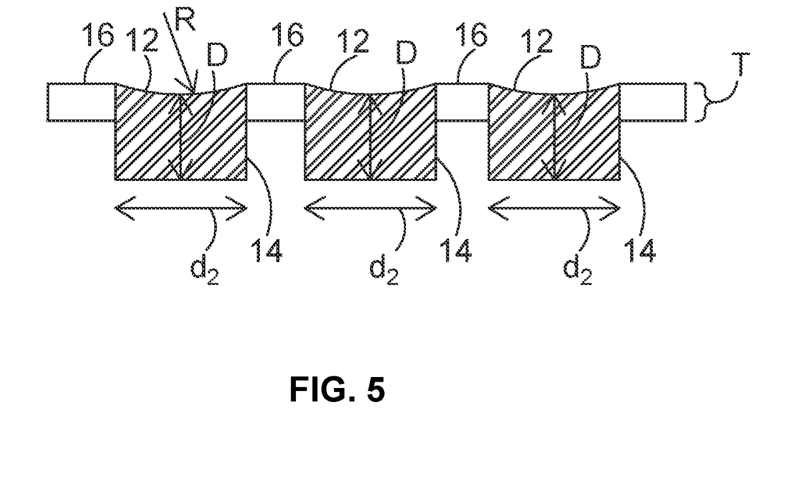
FIG. 5 is a cross-sectional view of the coupling material and preps in FIG. 4.

FIG. 4 is a top view of resulting sheet of uncured rubber 10 containing plurality of concave top surfaces 12 and coupling material formed into webbing 16. The sheet of uncured rubber 10 also includes lock pins 30 in the corners thereof. FIG. 5 depicts a cross-sectional view of the sheet 10 in FIG. 4. This cross-sectional view depicts a plurality of concave top surfaces 12 having a radius R and corresponding plurality of preps 14 and webbing 16 connecting the preps 14. As shown, the depth D of the preps 14 is greater than the thickness T of the webbing 16. Moreover, the concave top surfaces 12 have a diameter $d_1$ that is substantially equal to the diameter $d_2$ of the preps 14. However, the diameter $d_1$ of the concave top surfaces 12 is preferably between ½ the diameter $d_2$ of the preps 14 and 1.1 times the diameter $d_2$ of the preps 14. Also, the radius R of the concave top surfaces 12 is preferably greater than the radius of the inner cores, not shown.

Figure 6:
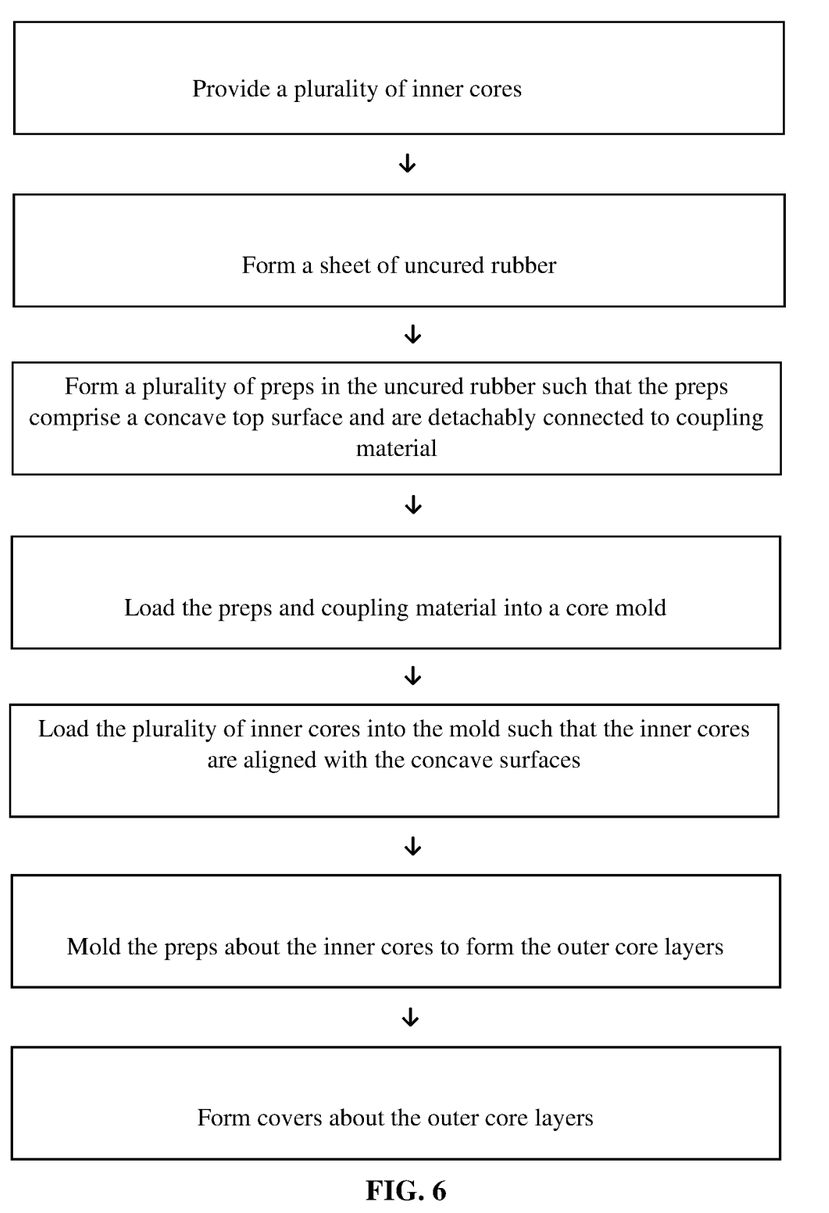
FIG. 6 is a flow chart setting forth steps of a method of the invention according to one embodiment.

Finally, FIG. 6 is a flow chart setting forth the steps of a method of the invention according to one embodiment of the invention.

Herein, the terms "inner core" and "center" are used interchangeably to refer to the innermost spherical core portion of the dual core of a golf ball of the invention formed by a method of the invention.

Meanwhile, the term, "layer", as used herein, means any spherical portion of the golf ball. It is contemplated that a resulting golf ball of the invention is at least a three-piece golf ball including the dual core and a cover.

In a preferred embodiment, the resulting dual core is surrounded by a layer that consists of a material that is different than the material of the outer core layer. This difference can be type of composition (i.e., thermoplastic rather than thermoset), type of ingredient, amount of each ingredient, and/or properties.

In some embodiments, the layer surrounding and adjacent to the resulting dual core is an intermediate layer such as an outermost core layer, an inner cover layer, a casing or mantle layer, a moisture barrier layer, a film layer, a coating layer, etc. In other embodiments, the layer surrounding and adjacent to the dual core is an outermost cover layer. Outer layers may be formed using any method known in the golf ball art or may even comprise a prep that is formed about inner layers using a method of the invention.

Non-limiting examples of suitable dual core compositions include rubber materials such as polybutadiene, ethylene-propylene rubber, ethylene-propylene-diene rubber, polyisoprene, styrene-butadiene rubber, polyalkenamers, butyl rubber, halobutyl rubber, and/or polystyrene elastomers.

In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyl-lithium is used as a catalyst. Other catalysts include, but are not limited to, aluminum, boron, lithium, titanium, and combinations thereof. The catalysts produce polybutadiene rubbers having different chemical structures.

In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures.

A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70 AC, and 320 AC, available from Firestone Polymers of Akron, Ohio.

To form the core, the polybutadiene rubber is used in an amount about 45 to about 95 weight percent. Preferably, the rubber material used to form the core layer comprises at least 50% by weight, and more preferably at least 70% by weight, polybutadiene rubber.

The rubber compositions of this invention may be peroxide-cured without inhibiting cure. Suitable organic peroxides include, but are not limited to, dicumyl peroxide; n-butyl-4,4-di(t-butylperoxy) valerate; 1,1-di(t-butylperoxy) 3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel.

Peroxide free-radical initiators are generally present in the rubber composition in an amount of at least 0.05 parts by weight per 100 parts of the total rubber, or an amount within the range having a lower limit of 0.05 parts and an upper limit of 10 parts by weight per 100 parts of the total rubber.

Suitable co-agents, where desired, may include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, xxx and nickel. In a particular embodiment, the co-agent is selected from zinc salts of acrylates, diacrylates, methacrylates, and dimethacrylates.

In another particular embodiment, the agent is zinc diacrylate (ZDA). When the co-agent is zinc diacrylate and/or zinc dimethacrylate, the co-agent is typically included in the rubber composition in an amount within the range having a lower limit of 1 parts by weight per 100 parts of the total rubber, and an upper limit of 40 parts by weight per 100 parts of the base rubber.

Radical scavengers such as a halogenated organosulfur or metal salt thereof, organic disulfide, or inorganic disulfide compounds may be added to the rubber composition.

Preferred halogenated organosulfur compounds include, but are not limited to, pentachlorothiophenol (PCTP) and salts of PCTP such as zinc pentachlorothiophenol (ZnPCTP).

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

The diameter and thickness of the different layers along with properties such as hardness and compression may vary depending upon the construction and desired playing performance properties of the golf ball. And the outer core layer is formed about the inner core/center using a method of the invention may have any known outer core layer thickness.

In any of the embodiments described above, it is envisioned that the dual-layer core may be replaced with a three or more layer core wherein each outer core layer may be formed using the methods described herein.

Golf ball layers surrounding the outer core layer may be comprised for example of partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Thermoset and thermoplastic polyurethanes may also be used as preferred covers in golf balls of the invention and may be formed as known in the golf ball art.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

What is claimed is:

1. A method of forming a plurality of golf balls comprising a plurality of inner cores, outer core layers and covers, comprising the steps of:
   providing a plurality of inner cores;
   forming a sheet of uncured rubber;
   feeding the sheet of uncured rubber through a set of opposing rollers to form a plurality of concave surfaces;
   forming a plurality of preps and a coupling material from the uncured rubber having the plurality of concave surfaces, such that the preps comprise one of the plurality of concave surfaces as a top surface and are detachably connected to each other via the coupling material,
   loading the preps and coupling material into a core mold;
   loading the plurality of inner cores into the mold such that the inner cores are aligned with the concave surfaces;
   molding the preps about the inner cores to form the outer core layers; and
   forming covers about the outer core layers.

2. The method of forming a plurality of golf balls of claim 1, wherein a sheet of uncured rubber having a uniform thickness is formed in a first set of opposing rollers and then the plurality of concave surfaces are formed in the sheet in a second set of opposing rollers.

3. The method of forming a plurality of golf balls of claim 2, wherein the sheet is further fed through a third set of opposing rollers that are collectively configured to form the preps with the concave top surfaces and the coupling material.

4. The method of forming a plurality of golf balls of claim 1, wherein the coupling material comprises a webbing.

5. The method of forming a plurality of golf balls of claim 4, wherein the set of opposing rollers has a plurality of convex surfaces formed on a first roller such that the convex surfaces of the first roller will form the concave surfaces in the sheet of uncured rubber when the sheet is fed between the first roller and a second roller; and wherein the first roller further contains a predetermined reverse webbing pattern that will form the webbing in the sheet of uncured rubber between the concave surfaces when the uncured rubber is fed between the first roller and the second roller.

6. The method of forming a plurality of golf balls of claim 5, wherein the set of opposing rollers has a plurality of convex surfaces formed on a first roller such that the convex surfaces of the first roller will form the concave surfaces in the sheet of uncured rubber when the sheet is fed between the first roller and a second roller; and wherein the second roller comprises a predetermined reverse webbing pattern that will form the webbing in the sheet of uncured rubber between the concave surfaces when the uncured rubber is fed between the first roller and the second roller.

7. The method of forming a plurality of golf balls of claim 1, wherein the coupling material and the plurality of preps are formed in the sheet of uncured rubber using a steel rule die.

8. The method of forming a plurality of golf balls of claim 1,
wherein the core mold comprises a plurality of core mold cavities, and
wherein the coupling material and preps with concave top surfaces is provided into the core mold as a continuous sheet wherein the preps align with core mold cavities.

9. The method of forming a plurality of golf balls of claim 8, wherein the continuous sheet is secured within the core mold by fasteners that are located in each corner of the continuous sheet and mate with mold fasteners that are disposed within corners of the core mold.

10. A method of forming a plurality of golf balls comprising a plurality of inner cores, outer core layers and covers, comprising the steps of:
providing a plurality of inner cores;
mixing rubber and additives to form uncured rubber and feeding the uncured rubber through a first pair of rollers to form a sheet of uncured rubber;
feeding the sheet of uncured rubber through a second set of rollers wherein a first roller is comprised of convex surfaces that form a plurality of concave surfaces in the sheet in a predetermined pattern;
forming a plurality of preps from the sheet having the plurality of concave surfaces such that each prep contains one of the concave surfaces;
forming a webbing in the sheet that detachably couples the preps;
loading the preps and webbing into a top core mold and a bottom core mold;
loading the inner cores into the bottom core mold such that the concave top surface of each prep in the bottom core mold aligns with an outer surface of one of the plurality of inner cores;
closing the top mold and the bottom mold;
molding the preps about the inner cores to form outer core layers; and
forming covers about the outer core layers.

* * * * *